United States Patent
Yoon et al.

(10) Patent No.: US 12,525,677 B2
(45) Date of Patent: Jan. 13, 2026

(54) BATTERY PACK, ELECTRONIC DEVICE, AND VEHICLE

(71) Applicant: LG Energy Solution, Ltd., Seoul (KR)

(72) Inventors: Hyoung-Chul Yoon, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 660 days.

(21) Appl. No.: 17/763,576

(22) PCT Filed: Aug. 19, 2020

(86) PCT No.: PCT/KR2020/011056
§ 371 (c)(1),
(2) Date: Mar. 24, 2022

(87) PCT Pub. No.: WO2021/071082
PCT Pub. Date: Apr. 15, 2021

(65) Prior Publication Data
US 2022/0336903 A1 Oct. 20, 2022

(30) Foreign Application Priority Data
Oct. 10, 2019 (KR) .................. 10-2019-0125482

(51) Int. Cl.
*H01M 50/244* (2021.01)
*H01M 50/213* (2021.01)
*H01M 50/249* (2021.01)

(52) U.S. Cl.
CPC ....... *H01M 50/244* (2021.01); *H01M 50/213* (2021.01); *H01M 50/249* (2021.01)

(58) Field of Classification Search
None
See application file for complete search history.

(56) References Cited

U.S. PATENT DOCUMENTS

| 8,034,476 B2 | 10/2011 | Ha et al. | |
| 2012/0121956 A1* | 5/2012 | Park | H01M 50/103 429/99 |

(Continued)

FOREIGN PATENT DOCUMENTS

| CN | 103503192 A | 1/2014 |
| CN | 203690444 U | 7/2014 |

(Continued)

OTHER PUBLICATIONS

Translation of JP2007273180A (Year: 2007).*

(Continued)

*Primary Examiner* — Jonathan G Leong
*Assistant Examiner* — Taeyoung Son
(74) *Attorney, Agent, or Firm* — Morgan, Lewis & Bockius LLP

(57) ABSTRACT

A battery pack includes a battery module including a plurality of secondary batteries and a module case having a first internal space in which the secondary batteries are received; and a pack housing having an intermediate housing forming a second internal space in which the module case is received. At least one guide rail is disposed on an inner surface of the intermediate housing, the guide rail protruding in an inward direction toward the battery module and extending in a vertical direction to guide the insertion of the module case in the vertical direction. At least one guide protrusion portion on an outer surface of a horizontal direction of the module case, the guide protrusion portion protruding in an outward direction and extending in the vertical direction to move in the vertical direction along the guide rail, and having at least one compression protrusion to press the guide rail.

10 Claims, 12 Drawing Sheets

(56) References Cited

U.S. PATENT DOCUMENTS

| | | |
|---|---|---|
| 2013/0313953 A1 | 11/2013 | Lee et al. |
| 2015/0311486 A1* | 10/2015 | Kwag ............... H01M 50/213 |
| | | 429/7 |
| 2019/0326569 A1 | 10/2019 | Chi et al. |
| 2019/0372069 A1 | 12/2019 | Lee et al. |
| 2020/0194756 A1 | 6/2020 | Chen et al. |

FOREIGN PATENT DOCUMENTS

| | | |
|---|---|---|
| CN | 204271159 U | 4/2015 |
| CN | 204614896 U | 9/2015 |
| CN | 206480677 U | 9/2017 |
| CN | 108232077 A | 6/2018 |
| CN | 110088938 A | 8/2018 |
| CN | 207896174 U | 9/2018 |
| CN | 109873104 A | 6/2019 |
| CN | 110088939 A | 8/2019 |
| JP | 2007273180 A * | 10/2007 |
| JP | 2011-049014 A | 3/2011 |
| JP | 5262042 B2 | 8/2013 |
| JP | 6229289 B2 | 11/2017 |
| KR | 10-2006-0063174 A | 6/2006 |
| KR | 10-2014-0121767 A | 10/2014 |
| KR | 10-2015-0007727 A | 1/2015 |
| KR | 10-2015-0122517 A | 11/2015 |
| KR | 10-2017-0053429 A | 5/2017 |
| KR | 10-1891535 B1 | 8/2018 |
| KR | 10-2018-0113906 A | 10/2018 |
| KR | 10-2019-0090189 A | 8/2019 |

OTHER PUBLICATIONS

International Search Report (with partial English translation) and Written Opinion issued in corresponding International Patent Application No. PCT/KR2020/011056 dated Nov. 19, 2020.

Extended European Search Report issued in corresponding European Patent Application No. 20874763.4 dated Sep. 2, 2022. Note: CN 204271159-U cited therein is already of record.

Office Action issued Sep. 20, 2023 for Chinese Patent Application No. 202080055812.X. Note: KR 2017-0053429 A & CN 204271159 U were cited in a prior IDS.

* cited by examiner

BATTERY PACK, ELECTRONIC DEVICE, AND VEHICLE

TECHNICAL FIELD

The present disclosure relates to a battery pack, and more particularly, to a battery pack with improved manufacturing efficiency and durability.

The present application claims the benefit of Korean Patent Application No. 10-2019-0125482 filed on Oct. 10, 2019 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory, effect, and thus they are gaining more attention than nickel-based batteries for their advantages that recharging can be done whenever it is convenient, the self-discharge rate is very low and the energy density is high.

A lithium secondary battery primarily uses a lithium-based oxide and a carbon material for a positive electrode active material and a negative electrode active material respectively. The lithium secondary battery includes an electrode assembly including a positive electrode plate and a negative electrode plate respectively coated with the positive electrode active material and the negative electrode active material and a separator interposed between the positive electrode plate and the negative electrode plate, and a cylindrical battery case in which the electrode assembly is hermetically received together with an electrolyte solution.

More recently, secondary batteries are being widely used in not only small devices such as portable electronic products but also medium- and large-scale devices such as vehicles and energy storage systems (ESSs). For use in medium- and large-scale devices, many secondary batteries are electrically connected to increase the capacity and output.

With the growing need for a large-capacity structure for use as an energy storage source, there is an increasing demand for a battery pack including a plurality of secondary batteries electrically connected in series and/or in parallel, a module case in which the secondary batteries are received, and a battery management system (BMS).

The battery pack generally further includes an outer housing made of a metal to receive and store the module case and the plurality of secondary batteries to protect them from external impacts. The module case received in the outer housing is fixed to the inside of the outer housing to prevent the module case from moving. This is to prevent a collision or an electrical short circuit between the internal components (the module case, busbars and the secondary batteries) of the battery pack when an external impact occurs.

However, when inserting the battery module into the internal space of the outer housing of the battery pack, a collision between the battery module received in the outer housing and the outer housing occurs due to the narrow inside of the outer housing, causing damage to the battery module.

In case that there is a gap between the coupling structure between the battery module and the outer housing after assembly, when the battery pack is used as a power source for a vehicle that is frequently exposed to external impacts or vibrations, frequent friction or collisions between the outer housing and the battery module may occur, causing damage to the internal components.

The process of inserting and fixing the battery module into the outer housing is difficult and time-consuming. It results in the increased manufacturing cost of the battery pack.

DISCLOSURE

Technical Problem

The present disclosure is designed to solve the above-described problem, and therefore the present disclosure is directed to providing a battery pack with improved manufacturing efficiency and durability.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery pack according to the present disclosure includes a battery module including a plurality of secondary batteries and a module case having an outer wall configured to form an internal space for receiving the plurality of secondary batteries, and a pack housing including an intermediate housing formed in the shape of a box with open top and bottom and having an outer sidewall configured to form an internal space for receiving the module case, wherein at least one guide rail is provided on an inner surface of the intermediate housing, the guide rail protruding in an inward direction toward the battery module and extending in a vertical direction to guide the insertion of the module case in the vertical direction, and at least one guide protrusion portion is provided on an outer surface of a horizontal direction of the module case, the guide protrusion portion protruding in an outward direction and extending in the vertical direction to move in the vertical direction along the guide rail, and having at least one compression protrusion protruding to press the guide rail.

Additionally, the guide rail may have at least one guide groove that is recessed in a shape corresponding to an outer shape of a protruding direction of the guide protrusion portion and extends in the vertical direction, and the compression protrusion may be configured to press an inner surface of the guide groove.

Additionally, the guide protrusion portion may have a left surface or a right surface, a front surface, and a rear surface, and the compression protrusion may be provided on at least one of the left surface or the right surface, the front surface, or the rear surface of the guide protrusion portion.

Additionally, a pressing protrusion protruding to press the guide protrusion portion may be provided on the inner surface of the guide groove of the guide rail.

Additionally, the pressing protrusion may be formed at a location corresponding to the compression protrusion to come into close contact with an outer surface of the compression protrusion on the inner surface of the guide groove.

Additionally, the battery pack may include a stopper having a plate shape extending in the horizontal direction to limit the vertical movement of the module case provided on the guide rail.

Additionally, the module case may include a bumper portion disposed in contact with the intermediate housing and protruding in the outward direction from an outer surface of the outer wall to absorb an external impact.

Additionally, the bumper portion may include an extension part protruding and extending in the outward direction from the outer wall of the module case, and a plate-shaped part bent and extending in a direction facing the outer wall of the module case from an end of an extending direction of the extension part, and a rib may be provided on an outer surface of the plate-shaped part, the rib protruding in the outward direction and extending linearly in at least two directions.

Additionally, to achieve the above-described object, an electronic device according to the present disclosure includes at least one battery pack.

Additionally, to achieve the above-described object, a vehicle according to the present disclosure includes at least one battery pack.

Advantageous Effects

According to an aspect of the present disclosure, the present disclosure includes, on the inner surface of the intermediate housing, at least one guide rail inwardly protruding toward the battery module and extending in the vertical direction to guide the insertion of the module case in the vertical direction. In addition, the present disclosure includes, on the outer surface in the horizontal direction of the module case, at least one guide protrusion portion having at least one pressing protrusion protruding in the outward direction to move in the vertical direction along the guide rail and extending in the vertical direction to press the guide rail, thereby eliminating the gap between the battery module and the pack housing.

Additionally, according to an aspect of an embodiment of the present disclosure, the guide rail has at least one guide groove inserted in a shape corresponding to the outer shape of the protruding direction of the guide protrusion portion and extending in the vertical direction, so that the battery module may be stably inserted into the pack housing without collision between the battery module and the inner wall of the pack housing. Accordingly, it is possible to effectively prevent the damage to the battery module that may occur in the assembly process with the pack housing.

Additionally, according to another aspect of the present disclosure, the pressure protrusion protruding to press the guide protrusion portion is provided on the inner side of the guide groove of the guide rail, thereby eliminating the X-axis directional gap between the battery module and the intermediate housing. Accordingly, compared to the battery pack of FIG. 8, it is possible to prevent the damage and failure of the internal components of the battery pack that may occur during the use of the battery pack more effectively.

Additionally, according to another aspect of the present disclosure, a part of the pressing protrusion is formed at a location corresponding to the pressing protrusion to come into close contact with the outer surface of the pressing protrusion on the inner side of the guide groove, thereby achieving the closer and more tight coupling between the guide groove and the guide protrusion portion. According to the present disclosure, it is possible to prevent the damage and failure of the internal components of the battery pack that may occur during the use of the battery pack.

Additionally, according to another aspect of the present disclosure, the stopper in the shape of a plate that extends in the horizontal direction to limit the vertical movement of the module case is provided on top of the guide rail, thereby effectively eliminating the Z-axis directional gap between the battery module and the pack housing. Accordingly, it is possible to prevent the internal components of the battery pack from moving in the vertical direction, thereby preventing the damage and failure of the internal components of the battery pack that may occur during the use of the battery pack.

BRIEF DESCRIPTION OF THE DRAWINGS

The accompanying drawings illustrate preferred embodiments of the present disclosure, and together with the foregoing disclosure, serve to provide further understanding of the technical spirit of the present disclosure. However, the present disclosure is not to be construed as being limited to the drawings.

DETAILED DESCRIPTION

Figure 1:
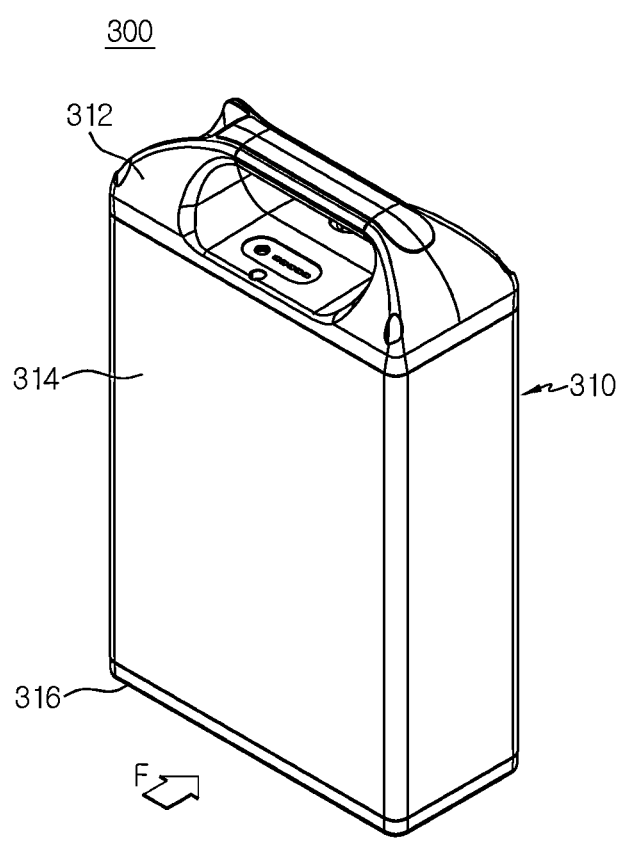
FIG. 1 is a perspective view schematically showing a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
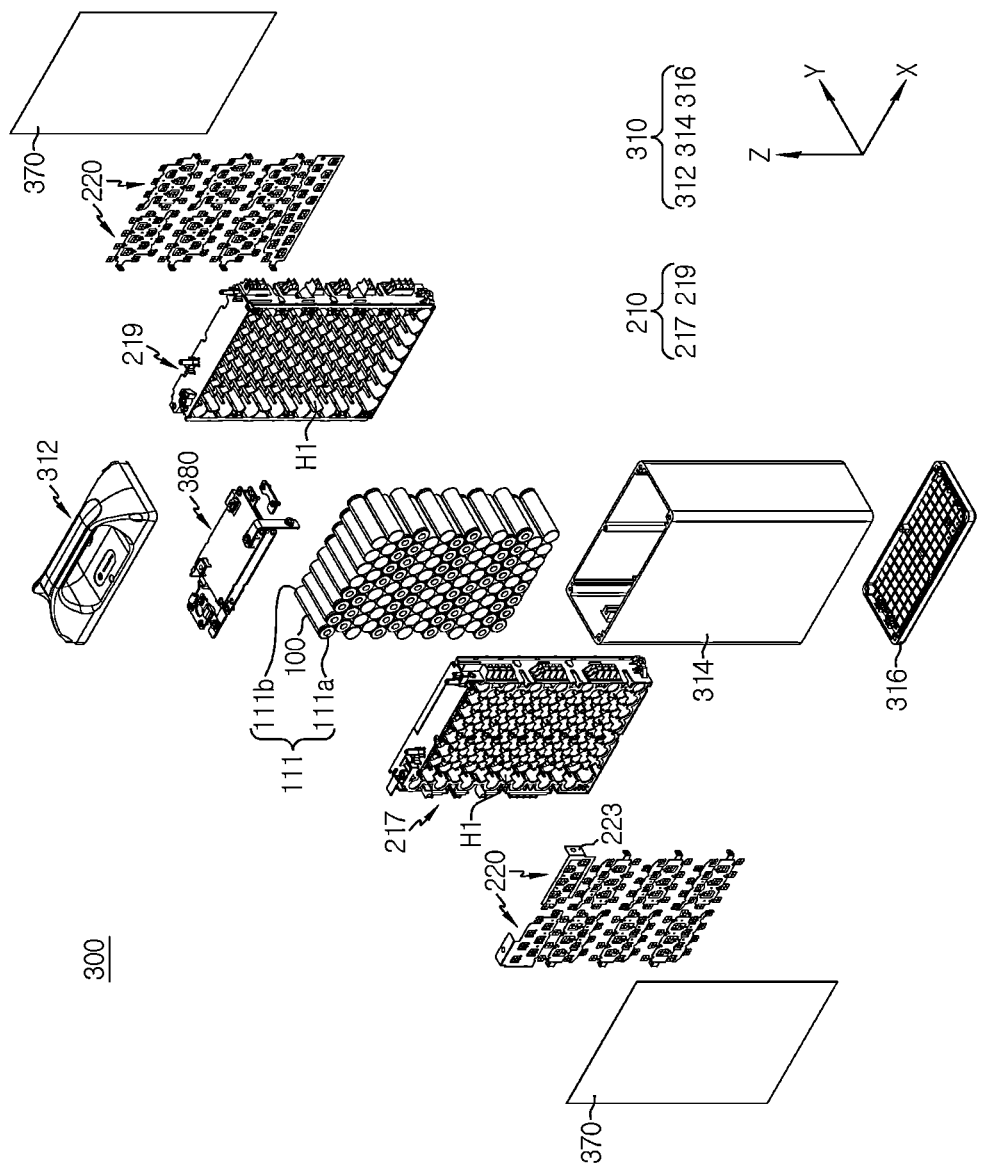
FIG. 2 is an exploded perspective view schematically showing some components of a battery pack according to an embodiment of the present disclosure.
Figure 3:
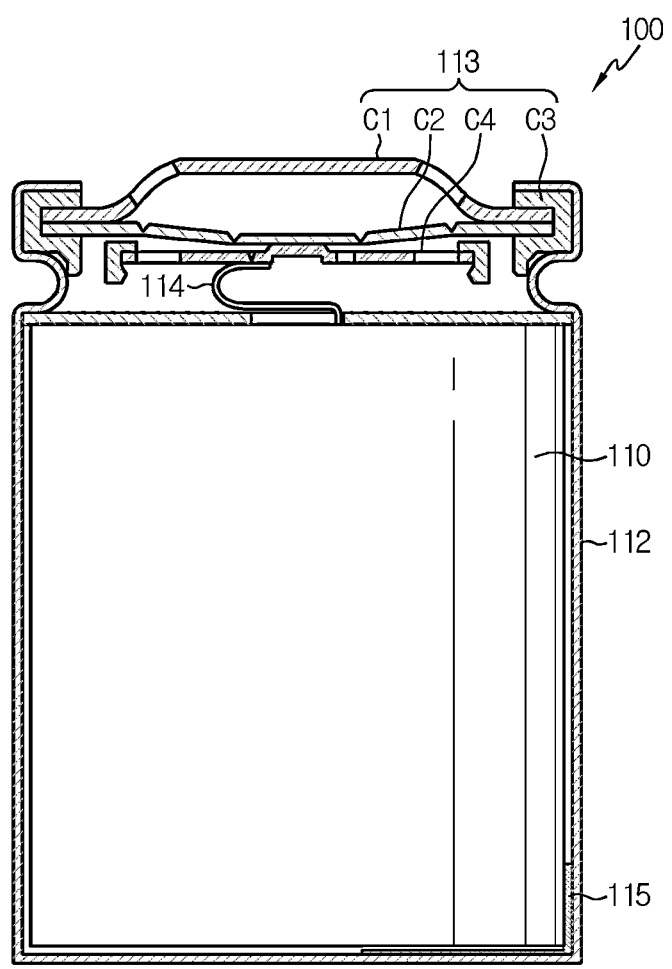
FIG. 3 is a cross-sectional view schematically showing the configuration of a can-type secondary battery according to an embodiment of the present disclosure.

FIG. 1 is a perspective view schematically showing a battery pack according to an embodiment of the present disclosure. FIG. 2 is an exploded perspective view schematically showing some components of the battery pack according to an embodiment of the present disclosure. FIG. 3 is a cross-sectional view schematically showing the configuration of a can-type secondary battery according to an embodiment of the present disclosure.

Referring to FIGS. 1 to 3, the battery pack 300 of the present disclosure includes a battery module 200 and a pack housing 310.

The battery module 200 may include a plurality of secondary batteries 100, a module case 210, and a busbar 220.

Here, the plurality of secondary batteries 100 may be can-type secondary batteries 100. The secondary battery 100 may include an electrode assembly 110, a battery can 112, and a cap assembly 113.

The electrode assembly 110 may have a structure in which a positive electrode plate and a negative electrode plate with a separator interposed between are wound, and the positive electrode plate may be connected to the cap assembly 113 with a positive electrode tab 114 attached to the positive electrode plate, and the negative electrode plate may be connected to the lower end of the battery can 112 with a negative electrode tab 115 attached to the negative electrode plate.

The battery can 112 may have an empty internal space to receive the electrode assembly 110. In particular, the battery can 112 may have a cylindrical or prismatic shape, with an open top. In addition, the battery can 112 may be made of a metal such as steel or aluminum to ensure stiffness. In addition, the battery can 112 may have the negative electrode tab attached to the lower end, and not only the lower part of the battery can 112 but also the battery can 112 itself may act as the negative electrode terminal 111b.

The cap assembly 113 may be coupled to the open top of the battery can 112 to hermetically close the open end of the battery can 112. The cap assembly 113 may have a circular or prismatic shape according to the shape of the battery can 112, and include sub-components such as a top cap C1, a safety vent C2, and a gasket C3.

Here, the top cap C1 may be positioned on top of the cap assembly 113 and extend upward. In particular, the top cap C1 may act as a positive electrode terminal of the secondary battery 100. Therefore, the top cap C1 may be electrically connected to other secondary battery 100, a load or a charger through an external device, for example, a busbar 220. The top cap C1 may be made of, for example, a metal such as stainless steel or aluminum.

The safety vent C2 may be configured to deform when the internal pressure of the secondary battery 100, that is, the internal pressure of the battery can 112 is higher than a certain level. Further, the gasket C3 may be made of an electrically insulating material to isolate the edges of the top cap C1 and the safety vent C2 from the battery can 112.

On the other hand, the cap assembly 113 may further include a current interrupt member C4. The current interrupt member C4 is referred to as a Current Interrupt Device (CID), and when the shape of the safety vent C2 is changed by the increased internal pressure of the battery due to gas generation, the contact between the safety vent C2 and the current interrupt member C4 is separated or the current interrupt member C4 is broken, causing disconnection of the electrical connection between the safety vent C2 and the electrode assembly 110.

The configuration of the cylindrical battery cell 100 is well known to those skilled in the art at the time of filing the patent application, and its detailed description is omitted herein. Although FIG. 3 shows an example of the battery cell 100, the battery module 200 according to the present disclosure is not limited to a specific type of battery cell 100. That is, various types of secondary batteries known at the time of filing the patent application may be used in the battery module 200 according to the present disclosure.

Although the secondary battery 100 of FIG. 3 is shown on the basis of the cylindrical secondary battery 100, the battery module 200 according to the present disclosure may include a prismatic secondary battery.

Referring back to FIG. 2, the plurality of secondary batteries 100 may be arranged in the horizontal direction (X-axis direction) and the vertical direction (Z-axis direction). For example, the plurality of secondary batteries 100 may be arranged in the vertical and horizontal directions as shown in FIG. 2. Furthermore, the plurality of secondary batteries 100 may be arranged such that tubular shapes of the cylindrical battery cans (112 in FIG. 3) are in contact with each other.

In particular, in the battery module 200 according to the present disclosure, the plurality of secondary batteries 100 may be placed in the horizontal direction (Y-axis direction). Here, the horizontal direction refers to a direction parallel to the ground. That is, as shown in FIG. 2, each of 112 secondary batteries 100 may extend in the front-rear direction. In this instance, the plurality of secondary batteries 100 may have the positive electrode terminals 111a and the negative electrode terminals 111b positioned in the front and rear directions respectively when viewed from the direction F of FIG. 1.

Meanwhile, the terms representing the directions such as front, rear, left, right, up, and down may vary depending on the position of the observer or the placement of the object. However, in the specification, for convenience of description, the directions such as front, rear, left, right, up, and down are defined when viewed from the direction F.

Figure 4:
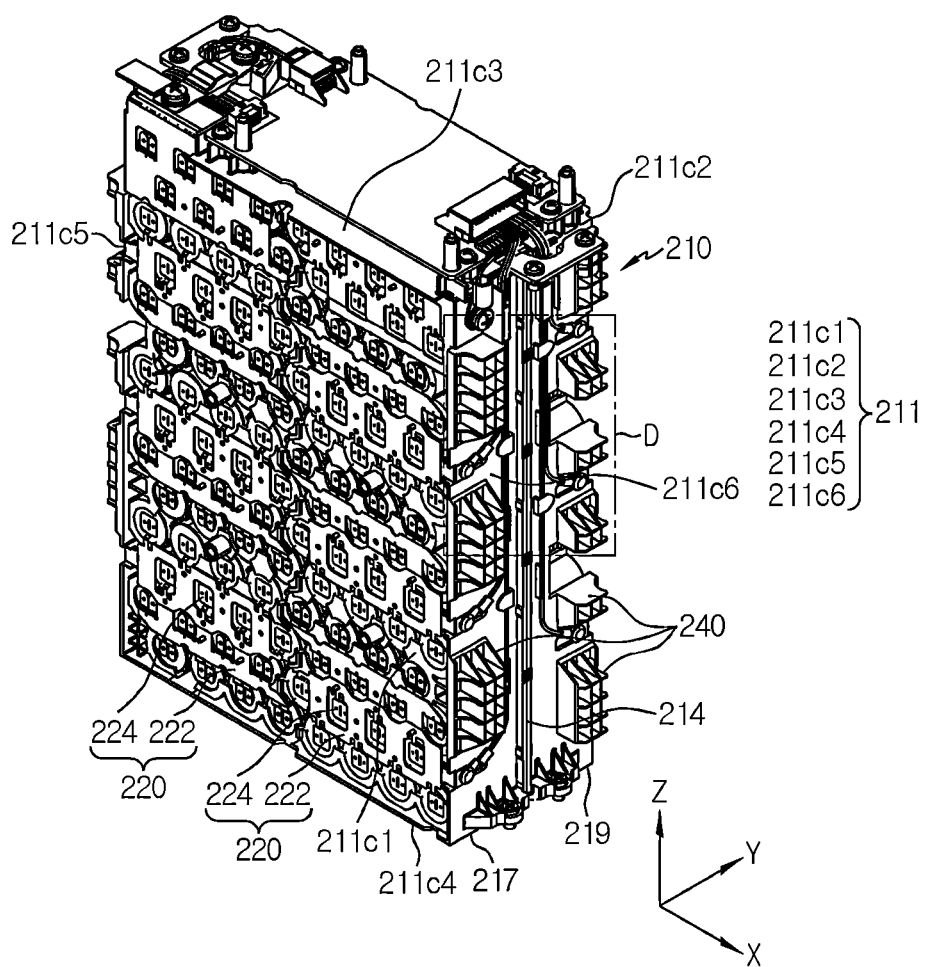
FIG. 4 is a perspective view schematically showing a battery module of a battery pack according to an embodiment of the present disclosure.

FIG. 4 is a perspective view schematically showing the battery module of the battery pack according to an embodiment of the present disclosure.

Referring to FIG. 4 along with FIG. 2, the module case 210 may include a first case 217 and a second case 219. The first case 217 may be configured such that the second case 219 is stacked on the rear side. For example, as shown in FIG. 2, when viewed from the Y-axis direction, the battery module 200 includes the first case 217 and the second case 217 disposed on the rear side. Each of the first case 217 and the second case 219 may have a hollow H1 into which a part of the secondary battery 100 is inserted.

In addition, the module case 210 may have an outer wall 211 to form an internal space in which the plurality of secondary batteries 100 is received.

The outer wall 211 may be formed to surround the internal space into which the plurality of secondary batteries 100 is inserted and received. Also, when viewed from the F direction of FIG. 1, the module case 210 may have a front wall 211c1, a rear wall 211c2, a top wall 211c3, a bottom wall 211c4, a left wall 211c5 and a right wall 211c6 formed in the front, rear, up, down, left and right directions to form an internal space. For example, as shown in FIG. 4, the module case 210 may have the front wall 211c1, the rear wall 211c2, the top wall 211c3, the bottom wall 211c4, the left wall 211c5 and the right wall 211c6.

Accordingly, according to this configuration of the present disclosure, the module case 210 has the outer wall 211 to effectively prevent the plurality of secondary batteries 100 received inside from an external impact.

In addition, at least two secondary batteries 100 may be placed and received in the internal space of the module case 210 in the horizontal direction (Y-axis direction). The stacking direction is not necessarily limited to one direction, and the secondary batteries 100 may be placed in the vertical direction (Z-axis direction).

Therefore, according to this configuration of the present disclosure, the module case 210 prevents the side of the secondary battery 100 from being exposed, thereby improving the insulation of the secondary batteries 100 and protecting the secondary batteries 100 from external physical and chemical elements.

Meanwhile, referring again to FIG. 4 along with FIG. 2, the busbar 220 may electrically connect the plurality of secondary batteries 100, for example, all the secondary batteries 100, or some of the secondary batteries 100. To this end, at least a part of the busbar 220 may be made of an electrically conductive material. For example, the busbar 220 may be made of a metal material such as copper, aluminum, nickel. Moreover, the busbar 220 may have a structure in which two plates using different main materials are joined. For example, the busbar 220 may include a nickel busbar plate and a copper busbar plate joined to each other.

Particularly, in the present disclosure, the busbar 220 may include a body portion 222 and a connection portion 224, as shown in FIG. 2.

The body portion 222 of the busbar 220 may be formed in a plate shape. Moreover, the busbar 220 may be configured in the form of a metal plate to ensure rigidity and electrical conductivity. In particular, the body portion 222 may stand upright in the vertical direction (Z-axis direction in the drawing) along the electrode terminals 111 of the plurality of secondary batteries 100.

The connection portion 224 may be configured to come into contact with the electrode terminals 111 of the plurality of secondary batteries 100. In this instance, the connection portion 224 may be welded to the electrode terminal 111. A part of the connection portion 224 may extend from the body portion 222.

That is, in the present disclosure, the plurality of secondary batteries 100 placed in the front-rear direction (the Y-axis direction of the drawing) may be stacked and arranged in the left-right direction (the X-axis direction of the drawing) and/or the vertical direction (the Z-axis direction of the drawing). In this instance, the body portion 222 may extend flat in the left-right direction and the vertical direction in a plate shape according to the arrangement direction of the electrode terminals 111 of the plurality of secondary batteries 100, and stand upright with respect to the ground.

Furthermore, the left and right sides of the body portion 222 of the busbar 220 may be provided with an external terminal 223 for sensing voltage or transmitting power to the outside by a sensing member (not shown).

In addition, the busbar 220 may come into contact with the same polarity of the plurality of secondary batteries 100 to electrically connect them in parallel. Alternatively, the busbar 220 may come into contact with the electrode terminals 111 of some of the secondary batteries 100 to electrically connect them in parallel and in series.

Furthermore, an electrical insulating insulation sheet 370 may be provided on the outer surface of the busbar 220. For example, as shown in FIG. 2, the two insulation sheets 370 may be provided on the front surface of the busbar disposed on the front side and the rear surface of the busbar disposed on the front side respectively.

Meanwhile, referring back to FIGS. 1 and 2, the pack housing 310 may include a top cover 312, an intermediate housing 314 and a bottom support 316. Specifically, when viewed from the F direction, the intermediate housing 314 may be coupled to the lower portion of the top cover 312, and the bottom support 316 may be coupled to the lower portion of the intermediate housing 314. More specifically, the top cover 312 may have an upper wall and a side wall to cover the top of the module case 210 received in the pack housing 310. In addition, the intermediate housing 314 may have a rectangular tubular shape with the open top and bottom. Further, the bottom support 316 is a box shape with the open top, and may include a side wall and a bottom wall.

Figure 5:
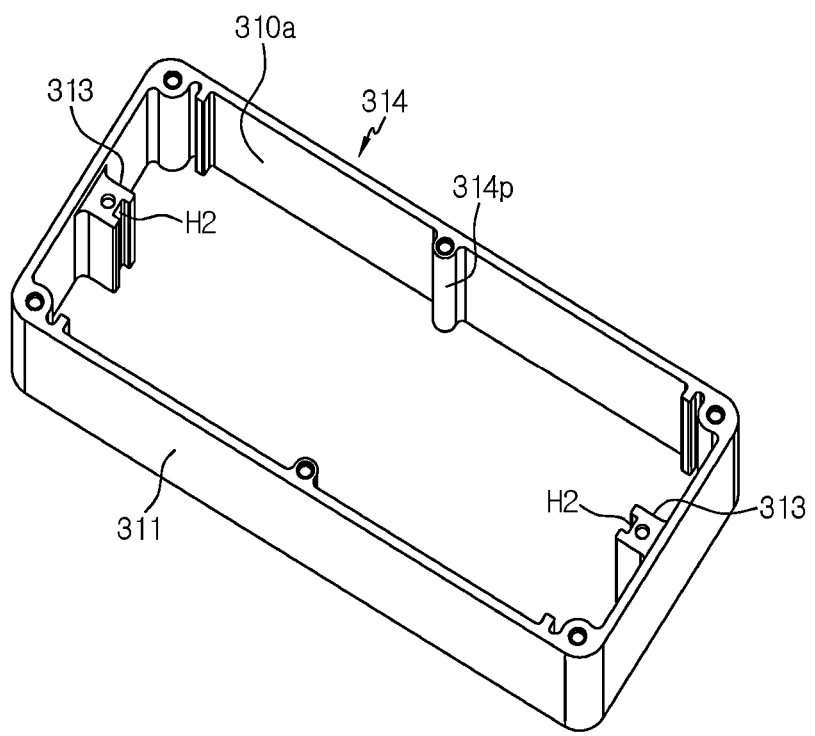
FIG. 5 is a perspective view schematically showing an intermediate housing of a battery pack according to an embodiment of the present disclosure.

FIG. 5 is a perspective view schematically showing the intermediate housing of the battery pack according to an embodiment of the present disclosure.

Referring back to FIG. 5 along with FIG. 2, the intermediate housing 314 may have a closed box shape having an internal space in which the module case 210 is received. Specifically, the intermediate housing 314 may have an outer sidewall 311 to form the internal space. The pack housing 310 may be formed by extrusion molding an aluminum alloy. In particular, the intermediate housing 314 may be formed by extrusion molding an aluminum alloy in the vertical direction.

Specifically, at least one guide rail 313 may be provided on an inner surface 310a of the intermediate housing 314 to guide the insertion of the module case 210 in the vertical direction. In addition, the guide rail 313 may extend in the vertical direction and protrude in the inward direction in which the battery module 200 is disposed.

For example, as shown in FIG. 5, the guide rail 313 provided in the inner surface 310a of the intermediate housing 314 may extend in the vertical direction on each of the left inner surface and the right inner surface of the intermediate housing 314. The guide rail 313 formed in the left inner surface of the intermediate housing 314 may extend in the right direction, and the guide rail 313 formed in the right inner surface of the intermediate housing 314 may extend in the left direction.

Figure 6:
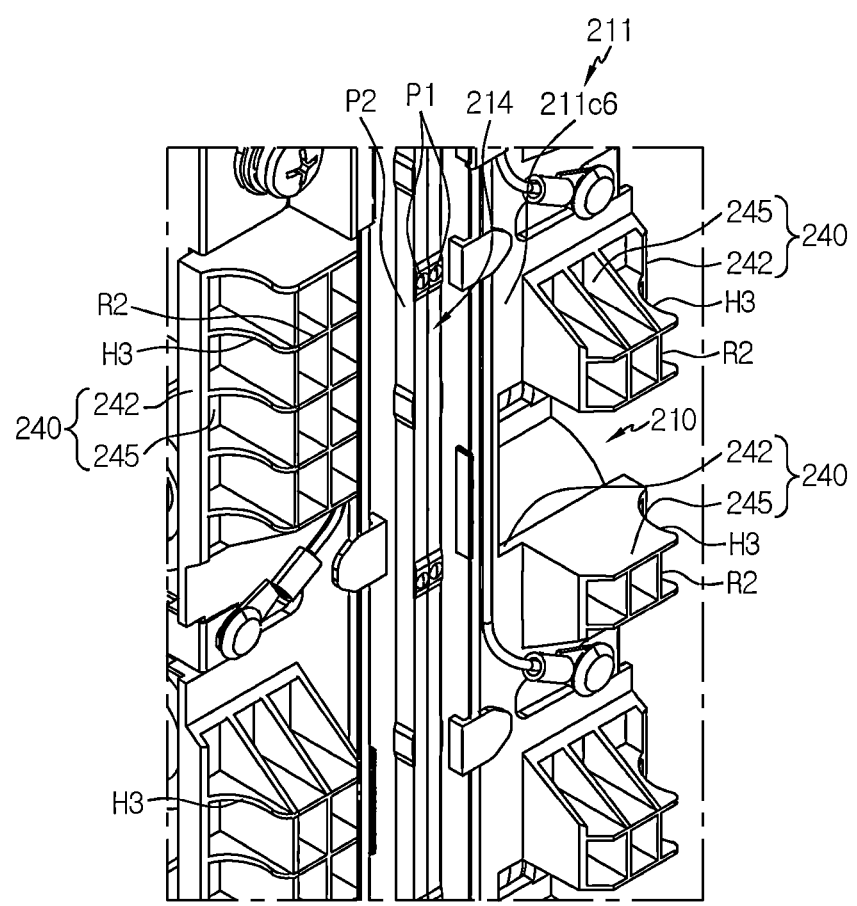
FIG. 6 is a schematic enlarged perspective view of section D of FIG. 4.

FIG. 6 is a schematic enlarged perspective view of section D of FIG. 4.

Referring back to FIGS. 4 and 6, at least one guide protrusion portion 214 may be provided on the horizontal outer surface of the module case 210. Specifically, the guide protrusion portion 214 may protrude in the outward direction and extend in the vertical direction to slidably move in the vertical direction along the guide rail 313.

For example, as shown in FIG. 5, the guide protrusion portion 214 configured to be moveable in the vertical direction along the guide rail 313 provided on each of the left inner surface and the right inner surface of the intermediate housing 314 may be provided in each of the left wall and the right wall of the module case 210. The guide protrusion portion 214 may have a vertical length corresponding to the vertical length of the guide rail 313. In addition, the guide protrusion portion 214 may be formed by combining parts of each of the first case 217 and the second case 219 into one. The guide protrusion portion 214 may have a rectangular parallelepiped shape extending in the vertical direction.

In addition, the guide protrusion portion 214 may be provided with at least one compression protrusion P1 protruding to press the guide rail 313. Specifically, the compression protrusion P1 may protrude from the outer surface of the guide protrusion portion 214 toward the position of the guide rail 313. The shape of the compression protrusion P1 may be, for example, a combination of at least one of a hemispherical shape, a quadrangular pyramid, a square prism or a cylinder. The shape is not limited thereto, and may include any shape in which the compression protrusion P1 presses the outer surface of the guide protrusion portion 214, to eliminate a gap between the guide protrusion portion 214 and the guide rail 313.

According to this configuration of the present disclosure, at least one guide rail 313 inwardly protruding toward the battery module 200 and extending in the vertical direction is provided on the inner surface 310a of the intermediate housing 314 to guide the insertion of the module case 210 in the vertical direction, and at least one guide protrusion portion 214 protruding in the outward direction and extending in the vertical direction to move in the vertical direction along the guide rail 313 and having at least one compression protrusion P1 protruding to press the guide rail 313 is provided on the outer surface in the horizontal direction of the module case 210, thereby eliminating the gap between the battery module 200 and the pack housing 310.

Furthermore, to solve the problems of the prior art, the present disclosure includes the compression protrusion P1 in the guide protrusion portion 214 to eliminate the gap between the battery module 200 and the pack housing 310. That is, the present disclosure may prevent damage and failure of the internal components of the battery pack 300 that may occur during the use of the battery pack 300. Moreover, when an internal defect of the battery pack 300 occurs during the production process, it is possible to disassemble and reassemble, thereby minimizing the defect rate.

Figure 7:
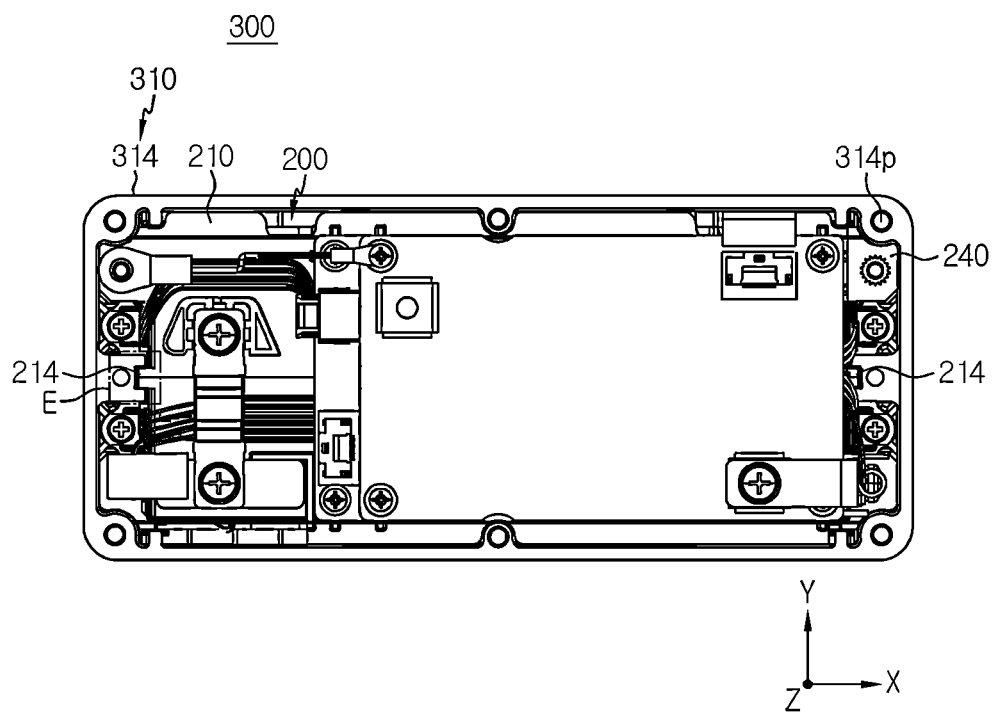
FIG. 7 is a plane view schematically showing some components of a battery pack according to an embodiment of the present disclosure.

FIG. 7 is a plane view schematically showing some components of the battery pack according to an embodiment of the present disclosure. In addition, FIG. 8 is a schematic enlarged plane view of section E of FIG. 7.

Figure 8:
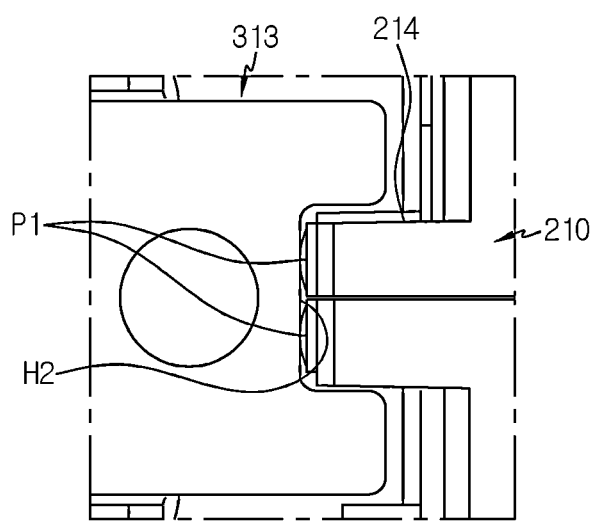
FIG. 8 is a schematic enlarged plane view of section E of FIG. 7.

Referring to FIGS. 7 and 8 along with FIGS. 5 and 6, the guide rail 313 may have at least one guide groove H2. Specifically, the guide groove H2 may have a recessed shape corresponding to the outer shape of the protruding direction of the guide protrusion portion 214. For example, as shown in FIG. 8, a guide groove H2 recessed in the inward direction of the body of the guide rail 313 may be provided in the outer surface of the protruding direction protruding in the horizontal direction of the guide rail 313.

The guide groove H2 may have a left inner surface or a right inner surface, a rear inner surface, and a front inner surface. The guide protrusion portion 214 may be inserted in contact with the left inner surface or the right inner surface, the rear inner surface and the front inner surface of the guide groove H2.

In addition, the compression protrusion P1 may be configured to press the inner surface of the guide groove H2. For example, as shown in FIG. 8, the compression protrusion P1 may be formed on the outer surface (the left surface) of the protruding direction of the guide protrusion portion 214. The compression protrusion P1 may serve to eliminate the horizontal (X-axis direction) gap between the guide groove H2 of each of the pack housing 310 and the battery module 200 and the guide protrusion portion 214.

In addition, as shown in FIGS. 5 and 6, a different type of compression protrusion P2 may be formed on the front and rear surfaces of the guide protrusion portion 214 in the Y-axis direction of FIG. 2. The different type of compression protrusion P2 may eliminate the gap of the left-right direction between the guide groove H2 and the guide protrusion portion 214 of each of the pack housing 310 and the battery module 200 (Y-axis direction of FIG. 2).

According to this configuration of the present disclosure, the guide rail 313 has at least one guide groove H2 inserted in a shape corresponding to the shape of the protruding direction of the guide protrusion portion 214 and extending in the vertical direction, to stably insert the battery module 200 into the pack housing 310 without collision with the inner wall of the pack housing 310. Accordingly, it is possible to effectively prevent the damage to the battery module 200 that may occur during assembly with the pack housing 310.

In the present disclosure, the compression protrusion P1 is configured to press the inner surface of the guide groove H2, thereby effectively eliminating the X-axis and Y-axis directional gap between the guide groove H2 and the guide protrusion portion 214 of each of the pack housing 310 and the battery module 200. Accordingly, it is possible to prevent the damage and failure of the internal components of the battery pack 300 that may occur during the use of the battery pack 300.

Figure 9:
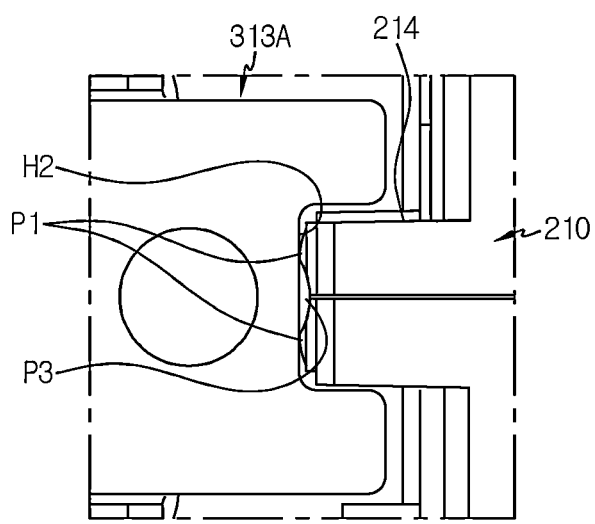
FIG. 9 is a partial plane view schematically showing a battery pack according to another embodiment of the present disclosure.

FIG. 9 is a partial plane view schematically showing a battery pack according to another embodiment of the present disclosure.

Referring to FIG. 9 along with FIG. 2 again, a guide groove H2 of a guide rail 313A of FIG. 9 may further include an inwardly protruding pressing protrusion P3 on the inner surface when compared to the guide groove H2 of the guide rail 313 of FIG. 8. The pressing protrusion P3 may be configured to press the outer surface of the guide protrusion portion 214. The pressing protrusion P3 may have a shape extending linearly in the vertical direction along the guide groove H2.

For example, the guide rail 313A may be provided on each of the left and right inner surfaces of the pack housing 310, the guide groove H2 may be formed in each of the two guide rail 313A, and the pressing protrusion P3 may be provided in each of the two guide grooves H2.

According to this configuration of the present disclosure, the pressing protrusion P3 protruding to press the guide protrusion portion 214 is provided on the inner surface of the guide groove H2 of the guide rail 313A to eliminate the X-axis directional gap between the battery module 200 and the intermediate housing 314. Accordingly, compared to the battery pack of FIG. 8, it is possible to prevent the damage and failure of the internal components of the battery pack 300 that may occur during the use of the battery pack 300 more effectively.

In addition, the pressing protrusion P3 may be formed at a location corresponding to the compression protrusion P1 on the inner surface of the guide groove H2 such that part of the pressing protrusion P3 comes into close contact with the outer surface of the compression protrusion P1. For example, as shown in FIG. 9, part of the pressing protrusion P3 may be sandwiched between two compression protrusions P1. However, the present disclosure is not necessarily limited to this structure, and the compression protrusion P1 may be interposed between two pressing protrusions P3.

According to this configuration of the present disclosure, part of the pressing protrusion P3 is formed at a location corresponding to the compression protrusion P1 for close contact with the outer surface of the compression protrusion P1 on the inner surface of the guide groove H2, thereby achieving the coupling between the guide groove H2 and the guide protrusion portion 214 more closely and firmly. Accordingly, compared to the battery pack 300 of FIG. 8, it is possible to prevent the damage and failure of the internal components of the battery pack 300 that may occur during the use of the battery pack 300 more effectively.

Figure 10:
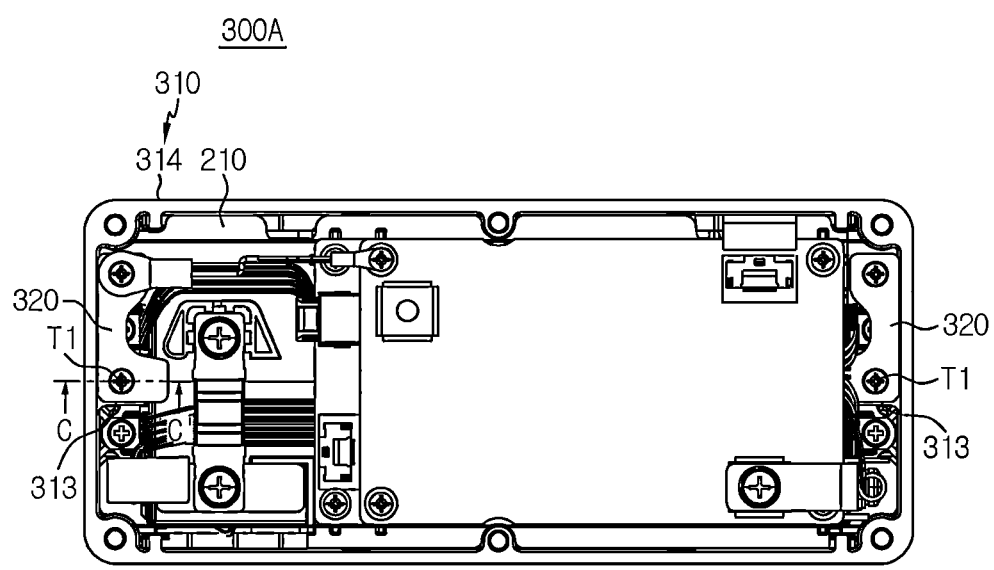
FIG. 10 is a plane view schematically showing some components of a battery pack according to another embodiment of the present disclosure.
Figure 11:
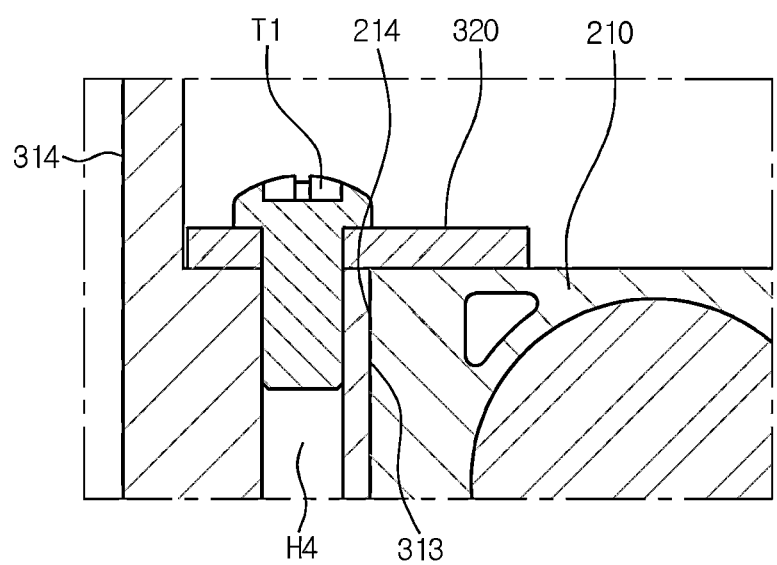
FIG. 11 is a schematic partial vertical cross-sectional view of FIG. 10 taken along line C-C'.

FIG. 10 is a plane view schematically showing some components of a battery pack according to another embodiment of the present disclosure. FIG. 11 is a schematic partial vertical cross-sectional view of FIG. 10 taken along line C-C'.

Referring to FIGS. 10 and 11, the battery pack 300A according to another embodiment of the present disclosure may include a stopper 320 on the guide rail 313 to limit the vertical movement of the module case 210. The stopper 320 may be in the shape of a plate that extends in the horizontal direction. The stopper 320 may be configured such that part of the plate shape presses down the guide protrusion portion 214 of the module case 210. The stopper 320 may be bolted to the top of the guide rail 313 using a bolt T1. To this end, the stopper 320 may have a bolt groove into which the bolt T1 is inserted, and a bolt groove H4 extending in the vertical direction may be formed on top of the guide rail 313.

For example, referring to FIGS. 4 and 10, the pack housing 310 may include the stopper 320 on top of the guide rail 313 provided on each of the left and the right surfaces. Each of the two stoppers 320 may be bolted to the top of the guide rail 313. In addition, each of the two stoppers 320 may be configured to press down the top surface of the guide protrusion portion 214 provided on each of the left wall 211c5 and the right wall 211c6 of the module case 210.

According to this configuration of the present disclosure, the stopper 320 in the shape of a plate that extends in the horizontal direction is provided on top of the guide rail 313 to limit the vertical movement of the module case 210, thereby effectively eliminating the Z-axis directional gap between the battery module 200 and the pack housing 310. Accordingly, it is possible to prevent the internal components of the battery pack 300A from moving in the vertical direction, thereby preventing the damage and failure of the internal components of the battery pack 300A that may occur during the use of the battery pack 300A.

Figure 12:
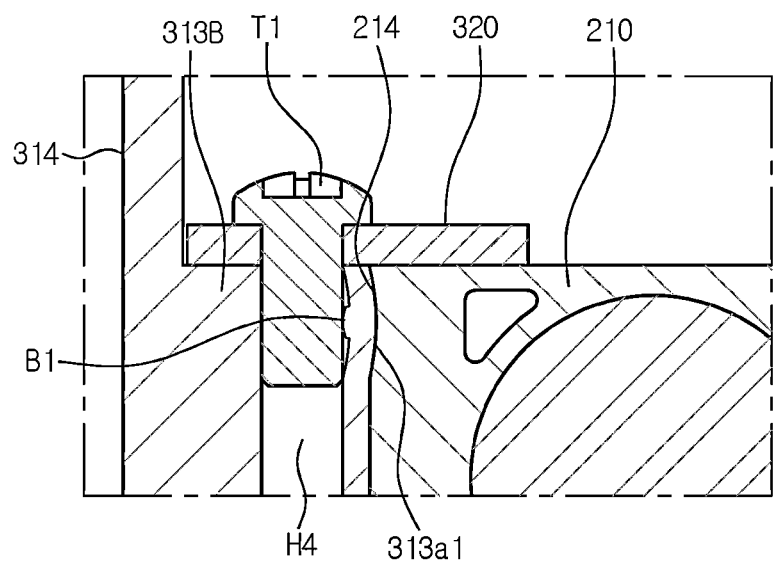
FIG. 12 is a partial vertical cross-sectional view schematically showing a battery pack according to another embodiment of the present disclosure.

FIG. 12 is a partial vertical cross-sectional view schematically showing a battery pack according to another embodiment of the present disclosure.

Referring to FIG. 12 along with FIG. 10, compared to the guide rail 313 of FIG. 11, the guide rail 313B of FIG. 12 may further include a convex portion B1 in the bolt groove H4 provided on top of the guide rail 313B. The convex portion B1 may protrude toward the body of the bolt T1.

In addition, the outer surface (the inner surface of the guide groove) of the location corresponding to the convex portion B1 of the guide rail 313B may have a convexly deformed shape in the outward direction by the bolt T1 inserted into the bolt groove H4 and the convex portion B1. The deformed portion of the guide rail 313B may be a partial inner surface 313a1 of the guide groove H2. The inner surface 313a1 convexly deformed in the outward direction of the guide groove H2 may be configured to press the outer surface of the guide protrusion portion 214. Accordingly, the deformed guide groove H2 of the guide rail 313B allows the close contact between the guide protrusion portion 214 and the inner surface 313a1 of the guide groove H2 without an X-axis directional gap.

According to this configuration of the present disclosure, the present disclosure is configured such that the convex portion B1 is formed in the bolt groove H4 provided on top of the guide rail 313B, the bolt T1 is inserted into the bolt groove H4, and the inner surface 313a1 of the guide groove H2 protruding in the inward direction presses the outer surface of the guide protrusion portion 214 by the bolt coupling, thereby effectively reducing the X-axis directional gap between the battery module 200 and the central housing 314. Accordingly, it is possible to effectively increase the durability of the battery pack 300.

Referring back to FIGS. 4, 5, and 6, the module case 210 may be provided with a bumper portion 240 to absorb an external impact applied to the battery module 200. Specifically, the bumper portion 240 may be disposed in contact with the intermediate housing 314 of the outer wall 211 of the module case 210. The bumper portion 240 may protrude in the outward direction from the outer surface of the outer wall 211. For example, as shown in FIGS. 4 and 5, the bumper portion 240 may be formed in each of the left wall 211c5 and the right wall 211c6 of the module case 210.

For example, as shown in FIG. 4, 9 bumper portions 240 protruding to the right from the right wall 211c6 of the module case 210 may be provided. Although not shown, 9 bumper portions 240 protruding to the left from the left wall 211c5 of the module case 210 may be provided.

Further, a gap may be formed between the bumper portion 240 and the outer sidewall 311 of the intermediate housing 314. That is, the bumper portion 240 may be spaced a predetermined distance apart from the outer sidewall 311 of the intermediate housing 314. For example, each of the 9 bumper portions 240 provided on the right wall 211c6 of the module case 210 may be spaced the predetermined distance apart from the outer sidewall 311 of the intermediate housing 314. Also, 9 bumper portions 240 protruding to the right from the right wall 211c6 of the module case 210 may be provided. Moreover, each of the bumper portions 240 provided on the right wall 211c6 of the module case 210 may be spaced apart from the outer sidewall 311 of the intermediate housing 314.

In this instance, when an external impact is applied to the battery module 200, the bumper portion 240 first collides with the outer sidewall 311 and deforms to absorb the external impact, thereby avoiding the direct transmission of the external impact to the secondary battery 100 embedded in the battery module 200.

According to this configuration of the present disclosure, the module case 210 includes the bumper portion 240 configured to absorb an external impact applied to the battery module 200, so that when an external impact is applied to the battery module 200, the bumper portion 240 deforms to absorb the impact, thereby protecting the secondary battery 100 embedded in the module case 210. Accordingly, it is possible to increase the stability of the battery module 200.

In addition, the bumper portion 240 may have an extension part 242 and a plate-shaped part 245. Here, the extension part 242 may protrude in the outward direction from the outer sidewall 311 of the module case 210.

In addition, the plate-shaped part 245 may be bent and extend in a direction facing the outer wall 211 of the module case 210 from an end in the extending direction of the extended part 242.

Further, the plate-shaped part 245 may have a linear rib R2 on the outer surface of the plate shape. Specifically, the rib R2 may be protrude in the outward direction and linearly extend in at least two directions. For example, as shown in FIG. 6, when viewed from the direction F of FIG. 1, the linear rib R2 may extend in the horizontal direction (X-axis direction) and the vertical direction (Z-axis direction) and intersect each other in a lattice shape. The rib R2 of may extend in a lattice shape.

According to this configuration of the present disclosure, as the bumper portion 240 includes the rib R2 protruding in the outward direction and linearly extending on the outer surface of the plate-shaped part 245, it is possible to maintain appropriate rigidity while effectively reducing the increases in the weight or material cost of the module case 210 caused by the addition of the bumper portion 240.

Moreover, the rib R2 may be brittle and prone to breaking for a superior impact absorption function. Accordingly, it is possible to increase the stability of the battery module 200. Further, the gap formed by the rib R2 may be used as a clearance to effectively absorb an external impact transmitted to the plate-shaped part 245.

In addition, the bumper unit 240 may include a slide groove H3 in which a rail post 314p provided on the inner wall of the intermediate housing 314 is inserted and slidably moves in the vertical direction. Through the slide groove H3, the battery module 200 of the present disclosure may be stably inserted into the intermediate housing 314 without collision or interference.

Meanwhile, the battery pack 300 according to an embodiment of the present disclosure may include at least one battery module 200. In addition, the battery pack 300 may further include various types of devices (not shown) for controlling the charge and discharge of the battery module 200, for example, a BMS (380 in FIG. 2), a current sensor and a fuse.

Meanwhile, an electronic device (not shown) according to an embodiment of the present disclosure includes at least one battery pack 300. The electronic device may further include a device housing (not shown) having a receiving space for receiving the battery module 200 and a display unit to allow a user to monitor the state of charge of the battery module 200.

In addition, the battery pack 300 according to an embodiment of the present disclosure may be included in a vehicle such as an electric vehicle or a hybrid vehicle. That is, the vehicle according to an embodiment of the present disclosure may include at least one battery pack 300 according to an embodiment of the present disclosure in the vehicle body.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

300: battery pack
100: secondary battery
200: battery module
210: module case
111, 111a, 111b: electrode terminal, positive electrode terminal, negative electrode terminal
211: outer wall
310: pack housing
311: outer sidewall
313: guide rail
214: guide protrusion portion
P1, P2: compression protrusion
H2: guide groove
P3: pressing protrusion
320: stopper
312: top cover
314: intermediate housing
316: bottom support
240: bumper portion
242: extension part
245: plate-shaped part
H4: bolt groove
R2: rib

INDUSTRIAL APPLICABILITY

The present disclosure relates to a battery pack. In addition, the present disclosure may be used in the field of electronic devices and vehicles comprising the battery pack.

What is claimed is:

1. A battery pack, comprising:
a battery module including a plurality of secondary batteries and a module case having an outer wall to form a first internal space in which the plurality of secondary batteries is received; and
a pack housing including an intermediate housing having a shape of a box with an open top and an open bottom and having an outer sidewall to form a second internal space in which the module case is received,
wherein the pack housing includes at least one guide rail disposed on an inner surface of the intermediate housing, the guide rail protruding in an inward direction toward the battery module and extending in a vertical direction to guide an insertion of the module case in the vertical direction,
wherein the battery module includes at least one guide protrusion portion on an outer surface of a horizontal direction of the module case, the guide protrusion portion protruding in an outward direction and extending in the vertical direction to move in the vertical direction along the guide rail, and having at least one compression protrusion protruding to press the guide rail,
wherein the guide rail has at least one guide groove that is recessed in a shape corresponding to an outer shape of a protruding direction of the guide protrusion portion and extends in the vertical direction,
wherein the compression protrusion is configured to directly press an inner surface of the guide groove in the horizontal direction to eliminate a gap between the battery module and the pack housing,
wherein the guide groove is recessed from an outer surface of the guide rail to an innermost surface of the guide groove in the horizontal direction,
wherein the innermost surface of the guide groove is located farther away from a center of the battery module than any other inner surface of the guide groove in the horizontal direction,
wherein the pack housing includes a pressing protrusion, and
wherein the pressing protrusion is disposed on the innermost surface of the guide groove and protrudes in the horizontal direction toward the battery module to directly and simultaneously press both of the compression protrusion and the guide protrusion portion in the horizontal direction, and the compression protrusion directly presses the innermost surface of the guide groove concurrently in the horizontal direction.

2. The battery pack according to claim 1, wherein the guide protrusion portion has a left surface or a right surface, a front surface, and a rear surface, and wherein the compression protrusion is on at least one of the left surface or the right surface, the front surface, or the rear surface of the guide protrusion portion.

3. The battery pack according to claim 1, wherein the pressing protrusion is formed at a location corresponding to the compression protrusion to come into close contact with an outer surface of the compression protrusion on the inner surface of the guide groove.

4. The battery pack according to claim 1, further comprising a stopper disposed on a top of the guide rail of the pack housing, the stopper having a plate shape extending in the horizontal direction and directly pressing of a top surface of the guide protrusion portion of the battery module to limit a vertical movement of the module case.

5. The battery pack according to claim 1, wherein the module case includes a bumper portion in contact with the intermediate housing and protruding in the outward direction from an outer surface of the outer wall to absorb an external impact.

6. The battery pack according to claim 5, wherein the bumper portion includes:

an extension part protruding and extending in the outward direction from the outer wall of the module case; and a plate-shaped part bent and extending in a direction facing the outer wall of the module case from an end of an extending direction of the extension part, and a rib is on an outer surface of the plate-shaped part, the rib protruding in the outward direction and extending linearly in at least two directions.

7. An electronic device comprising at least one battery pack according to claim 1.

8. A vehicle comprising at least one battery pack according to claim 1.

9. The battery pack according to claim 1, wherein:

the compression protrusion includes a plurality of compression protrusions; and the pressing protrusion is sandwiched between the plurality of compression protrusions.

10. The battery pack according to claim 1, wherein:

the pressing protrusion has a shape extending linearly in the vertical direction along the guide groove;

the compression protrusion includes a first plurality of compression protrusions and a second plurality of compression protrusions;

the first plurality of compression protrusions are disposed at a first height in the vertical direction and side by side in a second horizontal direction;

the second plurality of compression protrusions are disposed at a second height different from the first height in the vertical direction and side by side in the second horizontal direction; and the pressing protrusion is sandwiched between the first plurality of compression protrusions.

* * * * *